United States Patent
Ovshinsky et al.

(10) Patent No.: US 7,201,857 B2
(45) Date of Patent: *Apr. 10, 2007

(54) PERFORMANCE ENHANCING ADDITIVE MATERIAL FOR THE NICKEL HYDROXIDE POSITIVE ELECTRODE IN RECHARGEABLE ALKALINE CELLS

(75) Inventors: Stanford R. Ovshinsky, Bloomfield Hills, MI (US); Boyko Aladjov, Rochester Hills, MI (US); Srinivasan Venkatesan, Southfield, MI (US); Bora Tekkanat, Ann Arbor, MI (US); Meera Vijan, West Bloomfield, MI (US); Hong Wang, Troy, MI (US); Subhash K. Dhar, Bloomfield, MI (US)

(73) Assignee: Texaco Ovonic Battery Systems, LLC, Rochester Hills, MI (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/428,547

(22) Filed: May 2, 2003

(65) Prior Publication Data
US 2004/0219430 A1 Nov. 4, 2004

Related U.S. Application Data

(63) Continuation-in-part of application No. 10/378,586, filed on Mar. 3, 2003, now Pat. No. 7,172,710.

(51) Int. Cl.
*H01M 4/32* (2006.01)
*H01M 4/58* (2006.01)
*H01M 4/62* (2006.01)

(52) U.S. Cl. ............... 252/182.1; 252/500; 429/223; 429/231.5; 429/232

(58) Field of Classification Search ............ 252/518.1, 252/519; 429/44, 218.1, 223; 427/126.3
See application file for complete search history.

(56) References Cited

U.S. PATENT DOCUMENTS

| | | | | |
|---|---|---|---|---|
| 3,311,502 A | * | 3/1967 | Carson | 429/223 |
| 5,466,543 A | | 11/1995 | Ikoma et al. | |
| 5,523,182 A | * | 6/1996 | Ovshinsky et al. | 429/223 |
| 5,569,563 A | * | 10/1996 | Ovshinsky et al. | 429/223 |
| 5,707,756 A | * | 1/1998 | Inoue et al. | 429/57 |
| 5,766,789 A | * | 6/1998 | James et al. | 429/44 |
| 5,773,169 A | | 6/1998 | Matsuda et al. | |
| 6,027,834 A | * | 2/2000 | Hayashi et al. | 429/223 |
| 6,150,054 A | * | 11/2000 | Ovshinsky et al. | 429/223 |

(Continued)

FOREIGN PATENT DOCUMENTS

| | | | |
|---|---|---|---|
| JP | 10-125318 | * | 5/1998 |
| JP | 2002-033116 | * | 1/2002 |

(Continued)

OTHER PUBLICATIONS

Guoyen Chen, Simon R. Bare, Thomas E. Meallouk, Development of Supported Bifunctional Electrocatalysts for Unitized.
Regenerative Fuel Cells, Journal of the Electrochemical Society, 149 (8) A1092-A1099 (2002).

*Primary Examiner*—Mark Kopec
*Assistant Examiner*—Kallambella Vijayakumar
(74) *Attorney, Agent, or Firm*—Kevin L. Bray; Marvin S. Siskind

(57) ABSTRACT

A conductive additive for the positive nickel electrode for electrochemical cells which provides increased performance by suppressing an oxygen evolution reaction occurring parallel to the oxidation of nickel hydroxide, increasing conductivity of the electrode and/or consuming oxygen produced as a result of the oxygen evolution reaction.

29 Claims, 1 Drawing Sheet

U.S. PATENT DOCUMENTS

Figure 1:
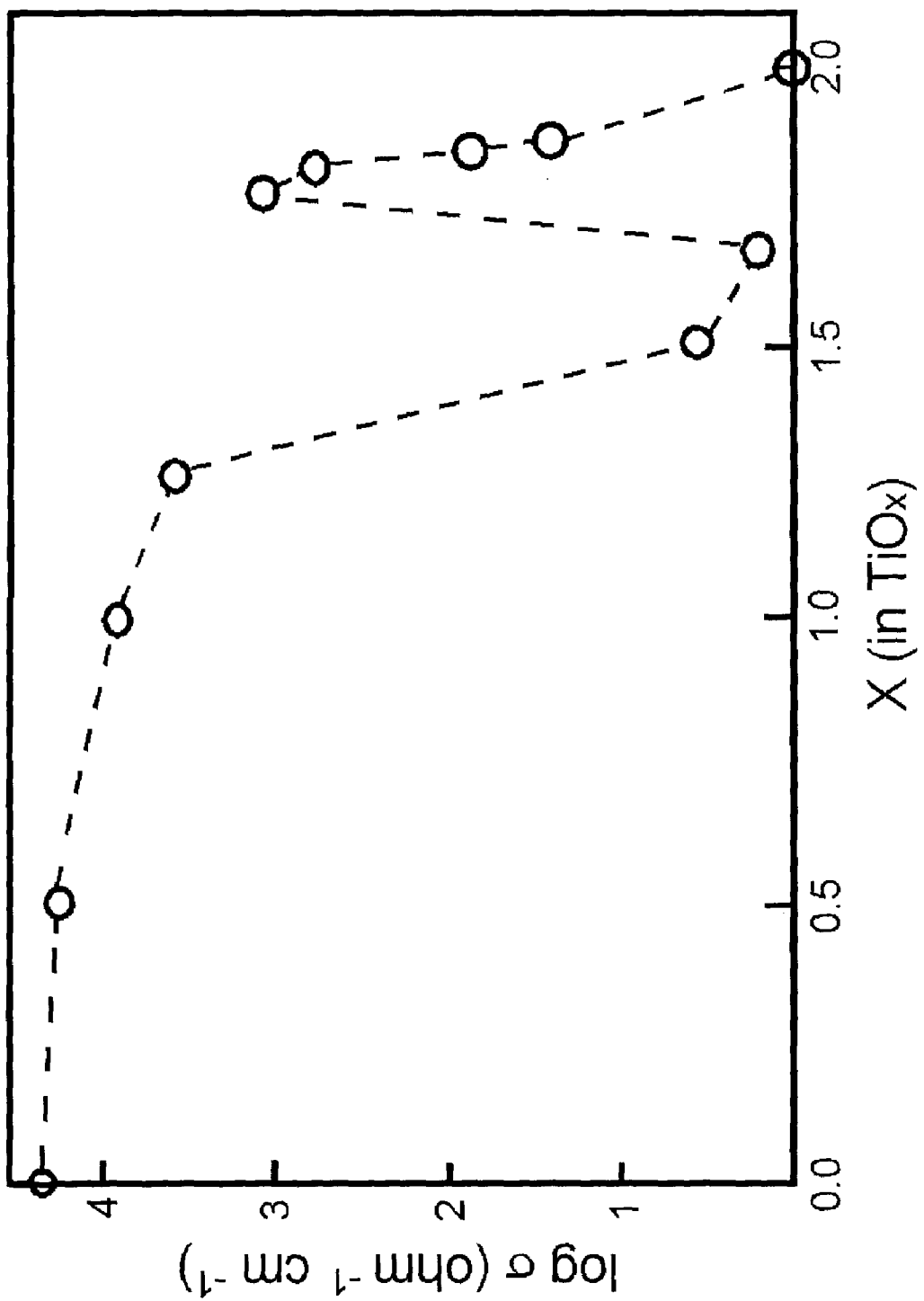

| | | |
|---|---|---|
| 6,177,213 B1 * | 1/2001 | Fetcenko et al. ........ 429/218.1 |
| 6,225,004 B1 * | 5/2001 | Hayashi ..................... 429/223 |
| 6,287,726 B1 | 9/2001 | Ohta et al. |
| 6,338,917 B1 * | 1/2002 | Maeda et al. .............. 429/223 |
| 6,489,059 B2 | 12/2002 | Suzuki et al. |
| 6,599,662 B1 * | 7/2003 | Chiang et al. ........... 429/218.1 |
| 2001/0012586 A1 * | 8/2001 | Hong et al. ................. 429/223 |
| 2001/0018148 A1 * | 8/2001 | Ohta et al. ................. 429/223 |

* cited by examiner

PERFORMANCE ENHANCING ADDITIVE MATERIAL FOR THE NICKEL HYDROXIDE POSITIVE ELECTRODE IN RECHARGEABLE ALKALINE CELLS

CROSS REFERENCE TO RELATED APPLICATIONS

The present invention is a continuation-in-part of, and is entitled to the benefit of the earlier filing date and priority of, U.S. patent application Ser. No. 10/378,586, to Ovshinsky et al., which is assigned to the same assignee as the current application, entitled "PERFORMANCE ENHANCING ADDITIVE MATERIAL FOR THE NICKEL HYDROXIDE POSITIVE ELECTRODE IN RECHARGEABLE ELECTROCHEMICAL CELLS", filed Mar. 3, 2003 now U.S. Pat. No. 7,172,710, the disclosure of which is hereby incorporated by reference.

FIELD OF THE INVENTION

The present invention generally relates to electrodes utilizing performance enhancing additives. More particularly, the present invention relates to utilizing a performance enhancing additive to increase power output in a rechargeable electrochemical cell by reducing positive electrode resistance.

BACKGROUND

The recent trend for portable-devices has increased the needs and requirements for high energy density and high power density rechargeable batteries. High energy density and high power density are also important criteria for batteries used for electric or hybrid vehicles.

Nickel hydroxide has been used for years as an active material for the positive electrode of alkaline electrochemical cells. Examples of such nickel-based alkaline cells include nickel cadmium (Ni—Cd) cells, nickel-iron (Ni—Fe) cells, nickel-zinc (Ni—Zn) cells, and nickel-metal hydride (Ni—MH) cells. The energy density of nickel-based electrochemical cells may be increased by closely packing the nickel hydroxide active material into an electrically conductive substrate such as a porous foam. However, there are limitations on the amount of pressure used to increase packing density. Application of too much pressure causes expansion of electrode plates and compresses the separators placed between the positive and negative electrodes. The overcompression of the cells limit the wettability as well as the amount of electrolyte in separators by squeezing out the absorbed electrolyte, which in turn deteriorates the performance of these cells.

In general, nickel-metal hydride (Ni—MH) cells utilize a negative electrode comprising a metal hydride active material that is capable of the reversible electrochemical storage of hydrogen. Examples of metal hydride materials are provided in U.S. Pat. Nos. 4,551,400, 4,728,586, and 5,536,591 the disclosures of which are incorporated by reference herein. The positive electrode of the nickel-metal hydride cell comprises a nickel hydroxide active material. The negative and positive electrodes are spaced apart in the alkaline electrolyte.

Upon application of an electrical current across a Ni—MH cell, the Ni—MH material of the negative electrode is charged by the absorption of hydrogen formed by electrochemical water discharge reaction and the electrochemical generation of hydroxyl ions:

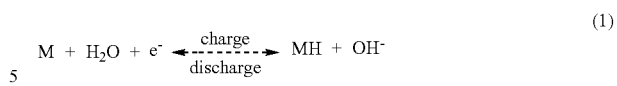

$$M + H_2O + e^- \underset{discharge}{\overset{charge}{\rightleftarrows}} MH + OH^- \tag{1}$$

The negative electrode reactions are reversible. Upon discharge, the stored hydrogen is released to form a water molecule and release an electron.

The charging process for a nickel hydroxide positive electrode in an alkaline electrochemical cell is governed by the following reaction:

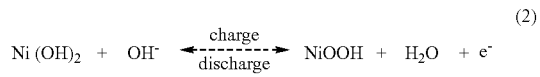

$$Ni(OH)_2 + OH^- \underset{discharge}{\overset{charge}{\rightleftarrows}} NiOOH + H_2O + e^- \tag{2}$$

After the first charge of the electrochemical cell, the nickel hydroxide is oxidized to form nickel oxyhydroxide. During discharge of the electrochemical cell, the nickel oxyhydroxide is reduced to form beta nickel hydroxide as shown by the following reaction:

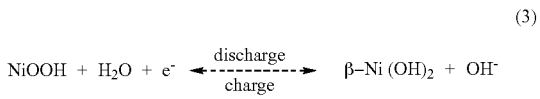

$$NiOOH + H_2O + e^- \underset{charge}{\overset{discharge}{\rightleftarrows}} \beta\text{-}Ni(OH)_2 + OH^- \tag{3}$$

The charging efficiency of the positive electrode and the utilization of the positive electrode material is affected by the oxygen evolution process which is controlled by the reaction:

$$2OH^- \rightarrow H_2O + \tfrac{1}{2}O_2 + 2e^- \tag{4}$$

During the charging process, a portion of the current applied to the electrochemical cell for the purpose of charging, is instead consumed by a parallel oxygen evolution reaction (4). The oxygen evolution reaction generally begins when the electrochemical cell is approximately 20–30% charged and increases with the increased charge. The oxygen evolution reaction is also more prevalent with increased temperatures. The oxygen evolution reaction (4) is not desirable and contributes to lower utilization rates upon charging, can cause a pressure build-up within the electrochemical cell, and can upon further oxidation change the nickel oxyhydroxide into its less conductive forms. One reason both reactions occur is that their electrochemical potential values are very close. Anything that can be done to widen the gap between them (i.e., lowering the nickel reaction potential in reaction (2) or raising the reaction potential of the oxygen evolution reaction (4)) will contribute to higher utilization rates. It is noted that the reaction potential of the oxygen evolution reaction (4) is also referred to as the oxygen evolution potential.

Furthermore, the electrochemical reaction potential of reaction (4) is highly temperature dependent. At lower temperatures, oxygen evolution is low and the charging efficiency of the nickel positive electrode is high. However, at higher temperatures, the electrochemical reaction potential of reaction (4) decreases and the rate of the oxygen evolution reaction (4) increases so that the charging efficiency of the nickel hydroxide positive electrode drops.

One way to increase the electrochemical potential of equation (4) is by adding certain additives with the nickel hydroxide active material when forming the positive electrode material. U.S. Pat. Nos. 5,466,543, 5,451,475, 5,571,636, 6,017,655 6,150,054, and 6,287,726 disclose certain additives which improve the rate of utilization of the nickel hydroxide in a wide temperature range. The present invention discloses an improved additive which enhances performance of the positive electrode by reducing the resistance within the nickel electrode and simultaneously increasing the oxygen evolution potential.

SUMMARY OF THE INVENTION

The present invention discloses an active material composition for a nickel positive electrode comprising a nickel hydroxide material and an additive material comprising a metal oxide. The metal oxide may be one or more of a single metal oxide containing a metal from the group comprising Ce, Ti, Mo, V, W, Sn, Mn, In, Y, Sm, and Nb, or a binary or higher non-stoichiometric, solid solution, oxide containing two metals from the group comprising Ti, Mo, V, W, Sn, Mn, In, Y, Sm, Nb, Ce, and Mm.

Preferably, the metal oxide includes cerium and/or titanium. Cerium oxide, as an additive to the positive electrode, may be further doped with a divalent oxide, a trivalent oxide, a tetravalent oxide, or combinations thereof to improve the overall electrode performance. The titanium oxide may also be comprised of two or more sub-oxides having the formula $TiO_x$, wherein x may range from 0.65 to 1.25.

The single oxide preferably has the formula $A_nO_{2n-1}$, wherein $4.0 \leq n \leq 10$ and A is a metal from the group comprising Ti, Mo, V, W, Sn, Mn, In, Y, Sm, or Nb. The binary or higher non-stoichiometric, solid solution, oxide preferably has the formula $B_x(A_nO_{2n-1})_{1-x}$, wherein $0.0 < x < 1.0$, $4.0 \leq n \leq 10$, A is one or more metals from the group comprising Ti, Mo, V, W, Sn, Mn, In, Y, Sm, or Nb, and B is one or more metals from the group comprising Ti, Mo, V, W, Sn, Mn, In, Y, Sm, Nb, Ce, and Mm.

The active material composition may comprise 78.6 to 85.6 weight percent nickel hydroxide, 3.0 to 6.0 weight percent cobalt, 3.0 to 8.0 weight percent cobalt oxide, 3.0 to 10.0 weight percent of additive material, and 0.4 weight percent binder material. Preferably, the active material comprises 5.0 to 9.0 weight percent of the additive material.

DETAILED DESCRIPTION OF THE DRAWINGS

FIG. 1, shows the conductivities of various titanium oxides ranging from pure metallic Ti to $TiO_2$.

DETAILED DESCRIPTION OF THE INVENTION

The present invention discloses a positive electrode active material comprising a nickel hydroxide material and a performance enhancing additive material. The performance enhancing additive material in accordance with the present invention may be comprised of one or more single, binary, or ternary or higher oxides. The additives in accordance with the present invention enhance performance in nickel hydroxide positive electrodes by suppressing oxygen evolution by increasing the oxygen evolution potential. The additive material may also further improve performance of the positive electrode by increasing conductivity within the positive electrode and/or consuming at least some of the evolved oxygen within the electrochemical cell.

In the embodiments of the present invention, the positive electrode active material generally comprises 73.6 to 88.1 weight percent nickel hydroxide, 3.0 to 6.0 weight percent cobalt, 3.0 to 8.0 weight percent cobalt oxide, 0.5 to 15.0 weight percent of additive material, and 0.4 weight percent binder material. Preferably, the additive material is present in the range of 5.0 to 9.0 weight percent.

The nickel hydroxide material may be any nickel hydroxide material known in the art. It is within the spirit and intent of this invention that any and all kinds of nickel hydroxide materials may be used. Examples of possible nickel hydroxide materials are provided in U.S. Pat. Nos. 5,348,822, 5,637,423,and 6,086,843 the disclosure of which are herein incorporated by reference.

The binder materials may be any material, which binds the active material together to prevent degradation of the electrode during its lifetime. Binder materials should be resistant to the conditions present within the electrochemical cells. Examples of binder materials, which may be added to the active composition, include, but are not limited to, polymeric binders such as polyvinyl alcohol (PVA), fluoropolymers, carboxymethyl cellulose (CMC), hydroxycarboxymethyl cellulose (HCMC), and mixtures thereof. An example of a fluoropolymer is polytetrafluoroethylene (PTFE) Other examples of additional binder materials, which may be added to the active composition, include elastomeric polymers such as styrene-butadiene rubber latex. Furthermore, depending upon the application, additional hydrophobic materials may be added to the active composition.

In a first embodiment of the present invention, the additive material may be cerium oxide. Cerium oxide is essentially nonconductive material, however, cerium oxide increases the oxygen evolution potential, thereby suppressing the parallel oxygen evolution reaction, and consumes at least some of the oxygen formed by the parallel oxygen evolution reaction, thus preventing further oxidation of the nickel positive electrode materials into nonconductive oxides.

In a second embodiment of the present invention, the additive material may comprise a single oxide formed from a metal selected from the group comprising Ti, Mo, V, W, Sn, Mn, In, Y, Sm, or Nb. These oxides are electroconductive and are able to reduce to some extent the overall resistance within the nickel positive electrode by increasing the conductivity and suppressing the parallel oxygen evolution reaction within the nickel positive electrode. Oxides of V, Ti, Mo, or W may form oxides in the Magneli Phase having the general formula $A_nO_m$ wherein n is in the range of 4 to 50 and A is a metal chosen from the group of Ti, Mo, V, and W. When A is Ti or V, m equals 2n−1, and when A is Mo or W, m equals 3n−1 or 3n−2. Metallic oxides in the Magneli phase may exhibit exceptional electroconductive properties as compared to other metallic oxides. Depending on the metal valency, these metals may form oxides comprising one or more sub-oxides having different conductivities. For example, Ti forms an oxide comprised of multiple sub-oxides having different conductivities. Titanium sub-oxides having the formula $TiO_x$, with $0.65 \leq x \leq 1.25$ have high conductivities and are preferred for use in the present invention. A plot showing the relationship between conductivity and stoichiometry of several different titanium oxides is shown in FIG. 1.

In a third embodiment of the present invention, the additive material may be a mixed oxide which is a non-stoichiometric, solid solution, binary or higher oxide. The non-stoichiometric, solid solution, binary oxides are formed from oxides of two or more metals selected from the group consisting of Ce, Mn, Co, Ni, Sm, Y, Nb, In, Ti, V, W, Mo, and Mm, wherein Mm is a Misch metal alloy formed from two or more of the rare earth metals. As a general rule, these oxides are represented by a formula $MO_2$ where M represents the sum total of all metals present in the oxide including the dopants. If it is a true binary, $MO_2$ will represent the total of two metals present in the alloy. Non stoichiometry in the oxides can be due to oxygen vacancy or metal vacancy in the oxide. In typical examples of $TiO_2$, in one case there is oxygen vacancy and in the other case there is oxygen excess. Both cause disturbances in the d-orbitals causing disorder in their lattices. This disorder (or non stoichiometry) results in enhanced conductivity and other benefits. When the binary or higher oxides are formed with V, Ti, Mo, or W, the oxides may fall within the Magneli phase. The formula for binary or higher oxides in the Magneli phase is $B_x(A_nO_m)_{1-x}$, wherein $0.0 < x \leq 1.0$, $4 \leq n \leq 50$, A is one or more metals selected from the group of Ti, Mo, V, W, and B is one or more metals chosen from the group of Ti, Mo, V, W, Sn, Mn, In, Y, Sm, Nb, Ce, and Mm. When A is either V or Ti, m is equal to $2n-1$ and when A is either Mo or W, m is equal to $3n-1$ or $3n-2$. Some elements such as Nb, when included in binary oxide increase the thermal and electrochemical stability to the binary oxide thereby preventing further oxidation of the binary oxide to lesser conductive forms. Preferably the binary oxides include cerium thereby providing increased conductivity, increased oxygen evolution potential, and consumption of at least some of the evolved oxygen within the nickel positive electrode. Niobium and cerium also increase the oxygen vacancies within the oxides. Examples of some of the preferred non-stoichiometric, solid solution, binary compounds including cerium or niobium are $Ce_{0.4}Ti_{3.6}O_7$, $Ce_2Ti_4O_{10}$, $Ce_2Ti_5O_{12}$, $CeTi_4O_9$, $CeTi_5O_{11}$, and $Nb_{0.1}Ti_{0.9}O_2$.

In a fourth embodiment of the present invention, the additive material may be a compositional mixture of two or more oxides selected from cerium oxide, single oxides, and binary or higher oxides as described above.

The additive material suppresses the oxygen evolution reaction by increasing the electrochemical over potential of the oxygen evolution reaction thereby making the nickel hydroxide oxidation the more favorable reaction within the electrode. Without addition of the additive material the overlapping range of the potential of the oxygen evolution reaction and the potential for the nickel hydroxide oxidation occurring during charging of the positive electrode is very large. The additive material raises the potential of the oxygen evolution reaction thereby reducing the overlapping range between the fully charged positive electrode potential and the potential for the oxygen evolution reaction.

As compared to other additives used to suppress the parallel oxygen evolution reaction occurring within the positive electrode, such as $Ca(OH)_2$, the additive materials in accordance with the present invention have a much higher conductivity resulting in lower overall resistance within the electrode. The excellent conductivity of the additive materials create increased conductivity within the positive electrode thereby providing higher power output for the resulting electrochemical cell.

Additive materials including cerium oxide provide an additional benefit by being able to consume at least some of the evolved oxygen via a redox couple mechanism. By consuming at least some of the evolved oxygen via an oxidation reaction, the redox couple prevents further oxidation of nickel oxyhydroxide and oxides contained in the additive material to less conductive forms. Cerium oxide, acts as a redox couple ($Ce_2O_3 <-> CeO_2$) by consuming oxygen produced by the parallel oxygen evolution reaction occurring during charging of the electrochemical cell. Oxygen is consumed by the cerium oxide redox couple via an oxidation reaction during charging and is released by the redox couple via a reduction reaction to form hydroxide ions during discharging. The redox couple reaction for cerium oxide is shown as:

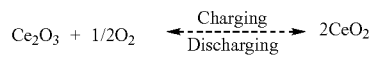

The mechanism behind the extraordinary ability of ceria ($CeO_2$) to store, release, and transport oxygen can be explained by oxygen-vacancy formation and migration coupled with the quantum process of electron localization. Ceria releases oxygen under reduction conditions forming a series of reduced oxides with stoichiometric cerium oxide ($Ce_2O_3$) as an end product, which in its turn easily takes up oxygen under oxidizing conditions, turning the $Ce_2O_3$ back into ceria. The $CeO_2$—$Ce_2O_3$ transition is entirely reversible.

Cerium is the first element in the periodic table with a partially occupied f orbital. This leads to many features of elemental cerium, such as the g-a iso-structural transition, where at a critical pressure the volume of the unit cell suddenly collapses preserving the face centered cubic (fcc) structure. The reason for this drastic change in volume at the transition point can be explained by the delocalization (or metallization) of the 4f electron under pressure.

This characteristic of cerium appears to be equally justified for the insulating cerium oxides, as cerium formally has the valance 4+ in $CeO_2$, the most oxidized form of cerium, and 3+ in $Ce_2O_3$, the other extreme final state of the transition. In $CeO_2$, all four valence electrons of Ce, $6s^2 5d^1 4f^1$, nominally leave the host atoms and transfer into the p bands of two oxygen atoms, while in $Ce_2O_3$ the Ce f electron is fully localized. The oxygen p band has two extra electrons provided by cerium. These electrons are left behind when an oxygen atom leaves its lattice position. The oxygen-vacancy formation process is essentially facilitated by a simultaneous condensation of these two electrons into localized f-level traps on two cerium (3+) atoms. Such a description of the two forms of cerium oxide, that the localization-delocalization of the Ce 4f electron is involved in the $CeO_2$—$Ce_2O_3$ transition, can also be supported from structural point of view on the microscopic level.

It is possible to choose a common unit cell for both cerium oxides. The C-type structure of $Ce_2O_3$, which is the end product of reduction process of $CeO_2$, can be constructed out of eight unit cells of $CeO_2$, with 25% oxygen vacancies ordered in a particular way. The addition or removal of oxygen atoms involves a minimal reorganization of the skeleton arrangement of cerium atoms. This structural property definitely facilitates the excellent reversibility of the reduction-oxidation process. The condensation of the f electron into core state of a Ce atom (i.e. its localization) leads to 10% volume increase. In other words, as far as the cerium atoms are concerned, the reduction-oxidation transition can be viewed upon as an almost isostructural transition accompanied by a 10% volume change, in resemblance with the g-a transition in pure fcc cerium showing a volume discontinuity of about 16%.

Clearly, on the microscopic level, the removal of an oxygen atom is made possible due to ability of the cerium atom to easily and drastically adjust its electronic configuration to best fit its immediate environment. Thus, the process of oxygen-vacancy formation is closely coupled with the quantum effect of localization/delocalization of the 4f electron of cerium. This is the basis for the oxygen storage capacity of cerium oxide.

To help promote the beneficial effect of the cerium oxide redox couple, the cerium oxide may be doped with divalent or trivalent oxides (or some of the oxides described above) to create additional structural defects causing more oxygen vacancies within the redox couple containing electrode. These additives do not change the fundamental character of the reactions but will improve their relative rates. In this aspect the additives could even be characterized as "promoters". Solid solutions of cerium oxide with some oxides such as Y or La can be readily formed. The resulting intentionally designed oxygen vacancies are mobile and form the dominant point defect involved in transport behavior; oxygen diffusion is very fast whereas the cation diffusion is slow.

When forming the positive electrode, the positive electrode active material is prepared and affixed to a current collector grid. The additive materials may be chemically impregnated into the active material, mechanically mixed with the active material, co-precipitated into or onto the surface of the active material from a precursor, distributed throughout the active material via ultrasonic homogenation, deposited onto the active material via decomposition techniques, or coated onto the active material. The positive electrode active material may be formed into a paste, powder, or ribbon. The positive electrode active material may also be pressed onto the current collector grid to promote additional stability throughout the electrode. The current collector grids in accordance with the present invention may be selected from, but not limited to, an electrically conductive mesh, grid, foam, expanded metal, perforated metal, or combination thereof. The most preferable current collector grid is an electrically conductive mesh having 40 wires per inch horizontally and 20 wires per inch vertically, although other meshes may work equally well. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate. One current collector grid may be used in accordance with the present invention, however the use of two current collector grids may further increase the mechanical integrity of the positive nickel electrode.

EXAMPLE 1

Several test cells using positive electrodes in accordance with the present invention were constructed and tested against a cell using a standard (control) positive electrode. To form the standard positive electrode, a standard positive electrode paste was formed from 88.6 weight percent nickel hydroxide material with co-precipitated zinc and cobalt from Tanaka Chemical Company, 5.0 weight percent cobalt, 6.0 weight percent cobalt oxide, and 0.4 weight percent polyvinyl alcohol binder. The paste was then affixed to a current collector grid to form the standard positive electrode. Three additional positive electrodes were constructed similarly by replacing 3.0 weight percent of the nickel hydroxide material with cerium oxide, 5.0 weight percent nickel hydroxide with cerium oxide, and 10.0 weight percent nickel hydroxide with cerium oxide respectively.

A positive limited tri-electrode battery cell (test battery cell) was formed using two hydrogen storage alloy negative electrodes, a nickel hydroxide positive electrode and an auxiliary Hg/HgO reference electrode. Each one of these electrodes are contained in a non conducting but porous separator bag to prevent shorting. The hydrogen storage alloy negative electrode includes an active electrode composition formed by physically mixing 97 wt % of a hydrogen storage alloy, 1.0 wt % carbon, and 2.0 wt % binder. The active electrode composition is made into a paste and applied onto a current collector grid to form the negative electrode.

After the initial formation procedure and two regular charge/discharge cycles, the control cell (utilizing standard positive nickel electrode) and the test cells (utilizing positive nickel electrode with cerium oxide) are each discharged to 50% depth of discharge at constant discharge current. The control cell and the test cells are then subjected to a sequence of 10 and 30 second discharge pulses of increasing magnitude (0.5 amp, 1 amp, 1.5 amp, etc.). The potential change ($\Delta V$) of the positive electrode after 10 and 30 seconds is measured relative to the Hg/HgO reference electrode. The positive electrode potential values in respect to Hg/HgO reference electrode (at the end of each of the discharge current pulses) were plotted versus the value of the discharge currents for both the control cell and the test cells. The slopes of the linear portion of the plots represents the resistance of each positive nickel electrode. The electrodes containing the cerium oxide showed reduced resistance as compared to the standard positive electrode tested under the same conditions. The resistance gradually decreased with the increase of cerium oxide up to 10 percent by weight of the positive electrode active material. The results for these tests are shown in Table 1.

TABLE 1

| Sample | Resistance at the end of a 10 Second Pulse | Resistance at the end of a 30 Second Pulse |
| --- | --- | --- |
| Standard Electrode | .065 Ohm | .072 Ohm |
| Electrode w/ 3 wt % $CeO_2$ | .059 Ohm | .065 Ohm |
| Electrode w/ 5 wt % $CeO_2$ | .049 Ohm | .054 Ohm |
| Electrode w/ 10 wt % $CeO_2$ | .047 Ohm | .052 Ohm |

EXAMPLE 2

Several test cells using a positive electrodes in accordance with the present invention was constructed and tested against a cell using a standard (control) positive electrode. To form the standard positive electrode, a standard positive electrode paste was formed from 88.6 weight percent AP64 nickel hydroxide material produced by Ovonic Battery Company with co-precipitated zinc and cobalt, 5.0 weight percent cobalt, 6.0 weight percent cobalt oxide, and 0.4 weight percent polyvinyl alcohol binder. The paste was then affixed to a current collector grid to form the standard positive electrode. Three electrodes in accordance with the present invention were constructed similarly by replacing some of the nickel hydroxide material with an additive material in accordance with the present invention. One electrode was constructed with 5.0 weight percent of the nickel hydroxide material being replaced with commercially available EBONEX (the registered trademark of Atraverda Limited) titanium oxide. A second electrode was constructed with 5.0 weight percent of the nickel hydroxide material being replaced with synthesized Magneli phase type titanium oxide with the overall formula $Ti_4O_7$. A third electrode was constructed with 5.0 weight percent of the nickel hydroxide material being replaced with a first sample of $Ce_{0.4}Ti_{3.6}O_7$ produced using a one step synthesis process. A fourth electrode was constructed with 5.0 weight percent of the nickel hydroxide material being replaced with a second sample of the same formulation $Ce_{0.4}Ti_{3.6}O_7$ produced using a two step synthesis process.

A sample of Magneli phase type titanium oxide ($Ti_4O_7$) was synthesized by combining an appropriate amount of $TiO_2$ powder and Ti powder and heating the well mixed homogeneous mixture for 4 hours at 1300° C. in a hydrogen environment. A first sample of $Ce_{0.4}Ti_{3.6}O_7$ was produced utilizing a one step process including combining appropriate amounts of $CeO_2$, $TiO_2$, and Ti, mixing the materials into a homogeneous mixture, and heating the mixture for 4 hours at 1200° C. in a hydrogen environment. A second sample of $Ce_{0.4}Ti_{3.6}O_7$ was produced utilizing a two step synthesis process including 1) combining $TiO_2$ and Ti and heating for 4 hours at 1300° C. in a hydrogen environment to form $Ti_4O_7$, and 2) adding $CeO_2$ and heating for an additional 4 hours at 1300° C. in a hydrogen environment to form $Ce_{0.4}Ti_{3.6}O_7$.

As described in example 1, a positive limited tri-electrode battery cell (test battery cell) was prepared using two hydrogen storage alloy negative electrodes, a nickel hydroxide positive electrode and an auxiliary Hg/HgO reference electrode. Each one of these electrodes are contained in a non conducting but porous separator bag to prevent shorting. The hydrogen storage alloy negative electrode includes an active electrode composition formed by physically mixing 97 wt % of a hydrogen storage alloy, 1.0 wt % carbon, and 2.0 wt % binder. The active electrode composition is made into a paste and applied onto a current collector grid to form the negative electrode.

After the initial formation procedure and two regular charge/discharge cycles, the control cell (utilizing standard positive nickel electrode) and the test cell (utilizing positive nickel electrode with additive material in accordance with the present invention) are each discharged to 50% depth of discharge at constant discharge current. The control cell and the test cells were then subjected to a sequence of 30 second discharge pulses of increasing magnitude (0.5 amp, 1 amp, 1.5 amp, etc.). The potential change ($\Delta V$) of the positive electrode after 10 and 30 seconds is measured relative to the Hg/HgO reference electrode. The positive electrode potential values in respect to Hg/HgO reference electrode (at the end of each of the discharge current pulses) were plotted versus the value of the applied discharge currents for both the control cell and the test cell. The slopes of the linear portion of the plots represents the resistance of each positive nickel electrode. The electrodes containing the additives in accordance with the present invention showed reduced resistance as compared to the standard positive electrode tested under the same conditions. The electrodes containing the $Ce_{0.4}Ti_{3.6}O_7$ formed by the two step process exhibited the best results. The results for these tests are shown in Table 2.

TABLE 2

| Sample | Resistance at the end of a 10 Second Pulse | Resistance at the end of a 30 Second Pulse |
|---|---|---|
| Standard Electrode | .065 Ohm | .071 Ohm |
| Electrode w/ 5 wt % Ebonex $Ti_4O_7$ | .056 Ohm | .062 Ohm |
| Electrode w/ 5 wt % synthesized $Ti_4O_7$ additive | .046 Ohm | .053 Ohm |
| Electrode w/ 5 wt % $Ce_{0.4}Ti_{3.6}O_7$ (1 step process) | .051 Ohm | .059 Ohm |
| Electrode w/ 5 wt % $Ce_{0.4}Ti_{3.6}O_7$ (2 step process) | .041 Ohm | .047 Ohm |

It is to be understood that the disclosure set forth herein is presented in the form of detailed embodiments described for the purpose of making a full and complete disclosure of the present invention, and that such details are not to be interpreted as limiting the true scope of this invention as set forth and defined by the appended claims.

The invention claimed is:

1. An active material composition for a nickel positive electrode comprising:
   a nickel hydroxide material; and
   an additive material consisting of a metal oxide selected from one or more of:
   a) a single metal oxide containing one metal selected from the group consisting of W, and
   b) a binary or higher non-stoichiometric, solid solution, oxide containing two or more metals selected from the group consisting of Ti, Mo, V, W, Sn, Mn, In, Y, Sm, Nb, Ce, and Misch Metal.

2. The active material composition according to claim 1, wherein said binary or higher non-stoichiometric, solid solution, oxide includes cerium.

3. The active material composition according to claim 1, wherein said binary or higher non-stoichiometric, solid solution, oxide includes cerium and titanium.

4. The active material composition according to claim 1, wherein said single oxide has the formula $A_nO_{3n-1}$, wherein $4.0 \leq n \leq 50$ and A is tungsten.

5. The active material composition according to claim 1, wherein said single oxide has the formula $A_nO_{3n-2}$, wherein $4.0 \leq n \leq 50$ and A is tungsten.

6. The active material composition according to claim 1, wherein said binary or higher non-stoichiometric, solid solution oxide has the formula $(A_nO_{2n-1})$, wherein $4.0 \leq n \leq 5.50$, and A is titanium and vanadium.

7. The active material composition according to claim 1, wherein said binary or higher non-stoichiometric, solid solution oxide has the formula $(A_nO_{3n-1})$, wherein $4.0 \leq n \leq 50$, and A is molybdenum and tungsten.

8. The active material composition according to claim 1, wherein said binary or higher non-stoichiometric, solid solution oxide has the formula $(A_nO_{3n-2})$, wherein $4.0 \leq n \leq 50$, and A is molybdenum and tungsten.

9. The active material composition according to claim 1, wherein said binary or higher non-stoichiometric, solid solution oxide has the formula $B_x(A_nO_{2n-1})_{1-x}$, wherein $0.0 < x \leq 1.0$, $4.0 \leq n \leq 50$, A is titanium and/or vanadium, and B is one or more metals chosen from the group of Ti, Mo, V, W, Sn, Mn, In, Y, Sm, Nb, Ce, and Misch Metal.

10. The active material composition according to claim 1, wherein said binary or higher non-stoichiometric, solid solution oxide has the formula $B_x(A_nO_{3n-1})_{1-x}$, wherein $0.0 < x \leq 1.0$, $4.0 \leq n \leq 50$, A is molybdenum and/or tungsten, and B is one or more metals chosen from the group of Ti, Mo, V, W, Sn, Mn, In, Y, Sm, Nb, Ce, and Misch Metal.

11. The active material composition according to claim 1, wherein said binary or higher non-stoichiometric, solid solution oxide has the formula $B_x(A_nO_{3n-2})_{1-x}$, wherein $0.0<x\leq 1.0$, $4.0\leq n\leq 50$, A is molybdenum and/or tungsten, and B is one or more metals chosen from the group of Ti, Mo, V, W, Sn, Mn, In, Y, Sm, Nb, Ce, and Misch Metal.

12. The active material composition according to claim 1, wherein said active material comprises 5.0 to 9.0 weight percent of said additive material.

13. An active material composition for a nickel positive electrode comprising:
  a nickel hydroxide material; and
  an additive material consisting essentially of a metal oxide selected from one or more of:
  a) a doped single metal oxide containing one metal selected from the group consisting of Ce, W, Sn, In, and Sm; and
  b) a binary or higher non-stoichiometric, solid solution, oxide containing two or more metals selected from the group consisting of Ti, Mo, V, W, Sn, Mn, In, Y, Sm, Nb, Ce, and Misch Metal.

14. The active material composition according to claim 13, wherein said doped single metal oxide is cerium oxide.

15. The active material composition according to claim 14, wherein said cerium oxide is doped with a divalent oxide.

16. The active material composition according to claim 14, wherein said cerium oxide is doped with a trivalent oxide.

17. The active material composition according to claim 14, wherein said cerium oxide is doped with a tetravalent oxide.

18. The active material composition according to claim 13, wherein said binary or higher non-stoichiometric, solid solution, oxide includes cerium.

19. The active material composition according to claim 18, wherein said binary or higher non-stoichiometric, solid solution, oxide includes cerium and titanium.

20. The active material composition according to claim 13, wherein said single oxide has the formula $A_nO_{3n-1}$, wherein $4.0\leq n\leq 50$ and A is tungsten.

21. The active material composition according to claim 13, wherein said single oxide has the formula $A_nO_{3n-2}$, wherein $4.0\leq n\leq 50$ and A is tungsten.

22. The active material composition according to claim 13, wherein said binary or higher non-stoichiometric, solid solution oxide has the formula $(A_nO_{2n-1})$, wherein $4.0\leq n\leq 50$, and A is titanium and vanadium.

23. The active material composition according to claim 13, wherein said binary or higher non-stoichiometric, solid solution oxide has the formula $(A_nO_{3n-1})$, wherein $4.0\leq n\leq 50$, and A is molybdenum and tungsten.

24. The active material composition according to claim 13, wherein said binary or higher non-stoichiometric, solid solution oxide has the formula $(A_nO_{3n-2})$, wherein $4.0\leq n\leq 50$, and A is molybdenum and tungsten.

25. The active material composition according to claim 13, wherein said binary or higher non-stoichiometric, solid solution oxide haste formula $B_x(A_nO_{2n-1})_{1-x}$, wherein $0.0<x\leq 1.0$, $4.0\leq n\leq 50$, A is titanium and/or vanadium, and B is one or more metals chosen from the group of Ti, Mo, V, W, Sn, Mn, In, Y, Sm, Nb, Ce, and Misch Metal.

26. The active material composition according to claim 13, wherein said binary or higher non-stoichiometric, solid solution oxide has the formula $B_x(A_nO_{3n-1})_{1-x}$, wherein $0.0<x\leq 1.0$, $4.0\leq n\leq 50$, A is molybdenum and/or tungsten, and B is one or more metals chosen from the group of Ti, Mo, V, W, Sn, Mn, In, Y, Sm, Nb, Ce, and Misch Metal.

27. The active material composition according to claim 13, wherein said binary or higher non-stoichiometric, solid solution oxide has the formula $B_x(A_nO_{3n-2})_{1-x}$, wherein $0.0<x\leq 1.0$, $4.0\leq n\leq 50$, A is molybdenum and/or tungsten, and B is one or more metals chosen from the group of Ti, Mo, V, W, Sn, Mn, In, Y, Sm, Nb, Ce, and Misch Metal.

28. The active material composition according to claim 13, wherein said active material composition comprises:
  78.6 to 85.6 weight percent nickel hydroxide;
  3.0 to 6.0 weight percent cobalt;
  3.0 to 8.0 weight percent cobalt oxide;
  3.0 to 10.0 weight percent of said additive material; and
  0.4 weight percent binder material.

29. The active material composition according to claim 28, wherein said active material comprises 5.0 to 9.0 weight percent of said additive material.

* * * * *